United States Patent [19]

Adams et al.

[11] Patent Number: 5,373,044

[45] Date of Patent: Dec. 13, 1994

[54] POLYCARBOXYLIC ACID THICKENERS, EMULSIFIERS, AND SUSPENDING AIDS HAVING IMPROVED WETTABILITY CHARACTERISTICS

[75] Inventors: Daniel J. Adams, Cuyahoga Falls; Zahid Amjad, Brecksville; Solomon Lemma, Broadview Heights; Carl J. Long, II, Elyria, all of Ohio

[73] Assignee: The BF Goodrich Company, Akron, Ohio

[21] Appl. No.: 198,007

[22] Filed: Feb. 17, 1994

Related U.S. Application Data

[63] Continuation-in-part of Ser. No. 935,616, Aug. 26, 1992, Pat. No. 5,288,814.

[51] Int. Cl.$^5$ .............................. C08F 2/26; C08F 2/08
[52] U.S. Cl. ..................................... 524/379; 525/450; 525/379; 528/76; 526/209; 526/193
[58] Field of Search ................ 525/450, 379; 524/379; 526/193, 209

[56] References Cited

U.S. PATENT DOCUMENTS

| | | | |
|---|---|---|---|
| 4,203,877 | 5/1980 | Baker | 524/500 |
| 4,692,502 | 9/1987 | Uebele | 526/193 |

Primary Examiner—James J. Seidleck
Assistant Examiner—I. Zemel
Attorney, Agent, or Firm—George W. Moxon, II

[57] ABSTRACT

A polymeric thickener, emulsifier or suspension aid having improved wettability which is an interpolymer of at least one olefinically unsaturated carboxylic acid containing at least one activated carbon-to-carbon olefinic double bond and at least one carboxyl group, in an amount of more than 15% by weight based upon the weight of the interpolymer, and at least one steric stabilizer surfactant having at least one hydrophilic moiety and at least one hydrophobic moiety and a linear block or a random comb configuration, or mixtures thereof, where the interpolymer has admixed therewith a wetting additive such as a low surface tension surfactant, a glycol, a polyhydric alcohol or mixtures thereof, and a process for dispersing the interpolymer by adding a low surface tension surfactant to the water into which the interpolymer is being dispersed.

27 Claims, No Drawings

POLYCARBOXYLIC ACID THICKENERS, EMULSIFIERS, AND SUSPENDING AIDS HAVING IMPROVED WETTABILITY CHARACTERISTICS

RELATED APPLICATIONS

This application is a continuation-in-part of U.S. Ser. No. 7/935,616, filed Aug. 26, 1992, now U.S. Pat. No. 5,288,814.

BACKGROUND OF THE INVENTION

This invention relates to polycarboxylic acid polymers, which are used as thickeners, emulsifiers and suspending aids, having improved wettability and dispersability. In particular, this invention relates to interpolymers of olefinically unsaturated carboxylic acids or anhydrides and a steric stabilizing component where the interpolymer has admixed therewith a wetting additive, such as a low surface tension surfactant, a glycol, a polyhydric alcohol, or mixtures thereof. The result is a polymer having improved wettability. In addition, we have developed a process for improving the wettability of interpolymers by adding the interpolymer to an aqueuous media containing a low surface tension surface active agent.

Carboxyl containing polymers of vinyl or vinylidene monomers containing at least one terminal $CH_2=C<$-group are well known. Such polymers may be homopolymers of unsaturated polymerizable carboxylic acids, such as acrylic acid, methacrylic acid, maleic acid, maleic anhydride, itaconic acid and the like; or copolymers of said acid or anhydride monomers with (meth)acrylate esters, (meth)acrylamides, olefins, maleic anhydrides, vinyl esters, vinyl ethers, and styrenics; or copolymers with other vinyl or vinylidene monomers. Copolymers of these acids may be cross-linked with small amounts of crosslinking agents. These materials are normally prepared by polymerization with a free radical catalyst in an organic medium in a closed vessel or autoclave equipped with stirring. During polymerization, the polymer precipitates from the solution as it is formed. The precipitated polymer is recovered and dried to remove residual solvent. The polymer, now in a powder form, is used by dispersing it in water and neutralizing it to use its thickening, suspending or emulsifying ability. Such polymers are disclosed in U.S. Pat. Nos. 2,798,053; 3,915,921; 3,940,351; 4,062,817; 4,066,583; and 4,267,103.

Polycarboxylic acid polymers in powder form historically have proven difficult to disperse in aqueous media, such as water. Special and often burdensome measures are typically required. Due to their very strong hydrophilic nature, particles of such polymers immediately begin swelling upon contact with water. When a large number of powder particles are added as a group to water, during swelling, a skin of hydrated particles can form around other dry particles before those dry particles can themselves be hydrated. The result is lumps of undispersed particles which cannot be easily eliminated. This phenomena is evident even when a small quantity (one gram or less) of crosslinked polyacrylic acid powder is dropped into water that is being agitated. To overcome these difficulties, special methods are used, such as dusting the powder over agitating water through the use of a sieve, use of a venturi eductor, or employment of a mechanical disperser, but they can slow processing, create high levels of airborne dust, and/or necessitate large capital expenditures.

It has been found, in copending U.S. patent application Ser. No. 07/935,616, filed Aug. 26, 1992, now U.S. Pat. No .5,288,814, that the incorporation of a steric stabilizer into the polymeric network can improve the dispersion of crosslinked polyacrylic acid powders into water. The polymer is less hydrophilic, and so the individual powder particles swell slowly, avoiding the rapid creation of a skin that would otherwise prevent hydration of all powder particles. When steric-stabilized crosslinked polyacrylic acid powder is added to water, one observes the absorption of water into the powder. As the particles wet, they form soft clusters of hydrated particles which eventually sink below the surface of the water. Once the particles are wetted out, they will begin to disperse throughout the water. Upon neutralization with an organic or inorganic base, the hydrated particles and clusters of hydrated particles greatly expand, eventually resulting in a smooth gel or viscous liquid.

Surfactants have been employed in the manufacture of carboxyl containing polymers because, in their manufacture, the aggregation of the polymer can interfere with the polymerization reaction by retarding access of the monomer to free radicals and by interfering with the removal of the heat produced by the polymerization. Further, the precipitated polymer forms a slurry in the solvent which becomes extremely thick, resulting in ineffective mixing and fouling on reactor surfaces. Even the presence of these surfactants does not result in a polymer having improved handling. These surfactants have not been considered low surface tension surfactants. A low surface tension surfactant would be a surfactant that is used as a wetting agent and capable of reducing the surface tension of water, which is about 72 dynes per centimeter at 25° C. to about 40 dynes/cm or less. Surface tension is usually measured using the Denooy Ring or Wilhelmy Plate Method.

For example, U.S. Pat. No. 4,375,533 to Park et al. discloses a process for overcoming some of the above problems, in which the polymerization of acrylic acid, and optional comonomers, in an organic media, is characterized by the use of nonionic surface active agents having a hydrophobe to lipophobe balance (HLB) values between 1 and about 10. U.S. Pat. No. 4,419,502, to Sehm, disclosed a process for the polymerization of acrylic acid and optional comonomers in the presence of a nonionic surface active agent selected from polyoxyethylene alkyl ethers and polyoxyethylene sorbitol esters and having an HLB value greater than 12. U.S. Pat. No. 4,420,596, to Lochhead et al., disclosed a process for polymerizing carboxylic acids in mineral spirits, employing nonionic surface active agents having HLB values less than 10. U.S. Pat. No. 4,526,937 to Hsu teaches the polymerization of acrylic acid in an organic solvent with a free radical catalyst, using nonionic block copolymers of propylene oxide and ethylene oxide to minimize undesirable flocculation and agglomeration. U.S. Pat. No. 4,692,502 to Uebele et at. teaches a process for polymerizing acrylic acid in an organic media with a free radical catalyst and at least one oil-soluble ionic surfactant selected from an anionic formula, a cationic formula, or an amphoteric formula to achieve reduced polymer build-up in the reactor and provide a more desirable particle size for the precipitated polymer.

Low surface tension surfactants have been employed in polymerization processes, involving the polymerization of ethylene and chlorotrifluoroethylene in an aqueous emulsion, such as in U.S. Pat. No. 4,482,685 to H. B. Chin et al, where a water soluble fluorosurfactant, such as Forathc or Fluorad surfactant, is employed. But, this use is in the polymerization per se and not to benefit the polymer after polymerization. Further, U.S. Pat. No. 4,310,698 to T. W. Cooke teaches fluorochemical surfactants for use as wetting agents, rinse aids and leveling agents, while U.S. Pat. No. 4,594,200 to G. S. Penny teaches the use of perfluoro-substituted compounds to reduce the tendency of surfaces to wet in increasing hydrocarbon production from subterranean formations.

SUMMARY OF THE INVENTION

The present invention resulted from the discovery that polycarboxylic acid polymers comprising interpolymers of olefinically unsaturated carboxylic acid or anhydride monomers containing at least one activated carbon to carbon olefinic double bond and at least one carboxyl group, and at least one steric stabilizing polymeric surface active agent (also called surfactant), having at least one hydrophilic moiety and at least one hydrophobic moiety and a linear block or random comb configuration, or mixtures thereof, which are admixed with a wetting additive or modifier, such as a low surface tension surfactant, a glycol, a polyhydric alcohol, or mixtures thereof, results in a polymer having improved wettability characteristics, while still possessing excellent thickening ability. It is preferred that the low surface tension surface active agent (or surfactant), the glycol or the polyhydric alcohol i.e., the wetting additive, be admixed after polymerizing the interpolymer. The wetting additive could be added to the monomers before polymerization or to the water into which the polymer is to be dispersed. The low surface active agent employed preferably will be able to lower the surface tension of water at 25° C. to less than 40 dynes per centimeter, preferably to less than 30 dynes/cm. Further, the surfactant can be a hydrocarbon, a silicone or a fluorocarbon surfactant, with a fluorocarbon surfactant preferred. The glycol is preferrable a low molecular weight polyethylene glycol. The polyhydric alcohol is preferably glycerine. The amount of wetting additive used will generally be less than 10% by weight, with 0.001% to 5.0% being preferred and less than 2.0% being further preferred.

DETAILED DESCRIPTION

In accordance with the present invention, one is able to obtain an improved polymer which is easy to wet-out, disperse and handle, and yields good thickening efficiency. This product is achieved by admixing a wetting additive with an interpolymer of a polycarboxylic acid and a steric stabilizing surfactant (or steric stabilizer).

The steric stabilizer can be a linear block copolymeric steric stabilizer, a random copolymeric comb steric stabilizer, or mixtures thereof. The amount of steric stabilizing surfactant used is in an amount of between about 0.001% and 20% based upon the weight of the vinylic monomers, i.e., the olefinically unsaturated carboxylic acids or anhydrides, to be polymerized, with 0.01 to 10% being preferred, and 0.2 to 6.0% being further preferred. The carboxylic acid or anhydride will comprise at least 15% by weight of the interpolymer, preferably at least 40% by weight of the interpolymer.

Polymerization of the carboxyl-containing monomers, optionally with other vinylidene comonomers, is usually carried out in the presence of a free radical catalyst in a closed vessel in an inert atmosphere under autogenous or artificially-induced pressure, or in an open vessel in an inert atmosphere optionally under reflux at atmospheric pressure. The temperature of the polymerization may be varied from about 0° to 125° C. or lower or higher. Polymerization at 25° to 90° C. using a free radical catalyst is generally effective in providing monomer to polymer conversions of 75 percent to 100 percent.

The polymerizations may be either batch, semi-batch or continuous. The agitation may be any agitation sufficient to maintain the slurry and obtain effective heat transfer including, for example, helical agitation, pitched turbines and the like. A useful reaction temperature range is from the range of 20° C. to 90° C. at about 1 atmosphere or more. Normal polymerization time is from about 3 to 12 hours.

Typical free-radical forming catalysts include peroxygen compounds such as sodium, potassium and ammonium persulfates, caprylyl peroxide, benzoyl peroxide, hydrogen peroxide, pelargonyl peroxide, cumene hydroperoxides, diisopropyl peroxydicarbonate, tertiary butyl diperphthalate, tertiary butyl perbenzoate, sodium peracetate, di-(2-ethylhexyl) peroxy dicarbonate, and the like; as well as azo catalysts such as azobis-(isobutyronitrile). Other catalysts utilizable are the so-called "redox" type of catalyst and the heavymetal activated catalyst systems. Ultraviolet light may also be used to generate free radicals. Some systems polymerize solely by heat, but catalysts generally provide better control. The monomers may be batch charged or continuously added during the course of polymerization or by any other manner of polymerization techniques conventionally used.

The polymerization reactions described herein are normally conducted in inert diluents that have solubilizing effect on one or more of the monomeric ingredients but substantially none on the resulting polymers. Stated differently, the medium used for the polymerization is an organic fluid, or mixtures of organic fluids, in which the monomers are preferably soluble but in which the polymer is substantially insoluble, so that the polymer product is preferably obtained as a fine friable or fluffy precipitate. Typical monomer solvents include liquid hydrocarbons selected from alkanes of 5 to 10, preferably 6 to 8 carbon atoms, such as hexane and heptane; cycloalkanes of 4 to 8, preferably 5 to 7 carbon atoms, such as cyclohexane; benzene and alkyl-substituted benzenes containing 1 to 2 lower alkyl substituents, preferably methyl substituents, such as toluene and xylene; alkyl carboxylates containing 1 to 6 preferably 1 to 4 carbon atoms in the alkyl groups and 2 to 6, preferably 2 to 4 carbon atoms in the carboxylate moiety, such as ethyl acetate, isopropyl acetate, propyl acetate, methyl acetate, and butyl acetate; haloalkanes and chlorofluoroalkanes, containing 1 to 3 carbon atoms and at least 2 halo groups, such as methylene chloride, ethylene dichloride, and 1,1,1-trichloroethane; ketones; and mineral spirits with a flash point greater than about 130° C. or mineral oil.

The amount of organic liquid solvent, such as benzene, used normally will be in excess of the components to be polymerized and the proportion may vary from at least 1 weight percent of the components and 99 percent solvent up to about 65 weight percent polymerizable components and 35 weight percent solvent. More normally, a concentration of about 10 to 60 percent polymerizable components is employed, where the weight percent is based on the total amount of ingredients charged to vessel. In the present application, a concentration of 10 to 50 percent, based upon the vinylic monomers is preferred.

The carboxyl containing polymers are prepared from monomers containing at least one activated >C=C<- group and carboxyl group. Such polymers are homopolymers of an unsaturated, polymerizable carboxylic monomers such as acrylic acid, methacrylic acid, maleic acid, itaconic acid, maleic anhydride, and the like, and copolymers of polymerizable carboxylic monomers with acrylate esters, acrylamides, olefins, vinyl esters, vinyl ethers, or styrenics. The carboxyl containing polymers have molecular weights greater than about 500 to as high as several million, usually greater than about 10,000 to 900,000 or more.

Typical materials are those described in U.S. Pat. No. 2,798,053. Copolymers, for example, include copolymers of acrylic acid with small amounts of polyalkenyl polyether cross-linkers that are gel-like polymers, which, especially in the form of their salts, absorb large quantities of water or solvents with subsequent substantial increase in volume. Other useful carboxyl containing polymers are described in U.S. Pat. No. 3,940,351, directed to polymers of unsaturated carboxylic acid and at least one alkyl acrylic or methacrylic ester where the alkyl group contains 10 to 30 carbon atoms, and U.S. Pat. Nos. 5,034,486; 5,034,487; and 5,034,488; which are directed to maleic anhydride copolymers with vinyl ethers. Other types of such copolymers are described in U.S. Pat. No. 4,062,817 wherein the polymers described in U.S. Pat. No. 3,940,351 contain additionally another alkyl acrylic or methacrylic ester and the alkyl groups contain 1 to 8 carbon atoms. Carboxylic polymers and copolymers such as those of acrylic acid and methacrylic acid also may be cross-linked with polyfunctional materials as divinyl benzene, unsaturated diesters and the like, as is disclosed in U.S. Pat. Nos. 2,340,110; 2,340,111; and 2,533,635. The disclosures of all of these U.S. patents are hereby incorporated herein by reference.

The carboxylic monomers are the olefinically-unsaturated carboxylic acids containing at least one activated carbon-to-carbon olefinic double bond, and at least one carboxyl group; that is, an acid or function readily converted to an acid containing an olefinic double bond which readily functions in polymerization because of its presence in the monomer molecule, either in the alpha-beta position with respect to a carboxyl group, —C=C—COOH; or as part of a terminal methylene grouping, CH$_2$=C<. Olefinically-unsaturated acids of this class include such materials as the acrylic acids typified by the acrylic acid itself, alpha-cyano acrylic acid, beta methylacrylic acid (crotonic acid), alpha-phenyl acrylic acid, beta-acryloxy propionic acid, cinnamic acid, p-chloro cinnamic acid, 1-carboxy-4-phenyl butadiene-1,3, itaconic acid, citraconic acid, mesaconic acid, glutaconic acid, aconitic acid, maleic acid, fumaric acid, and tricarboxy ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same carboxylic acid molecule. Maleic anhydride and other acid anhydrides useful herein have the general structure

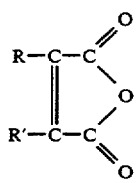

wherein R and R' are selected from the group consisting of hydrogen, halogen and cyanogen (—C≡N) groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers are the mono-olefinic acrylic acids having the general structure

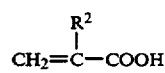

wherein $R^2$ is a substituent selected from the class consisting of hydrogen, halogen, and the cyanogen (—C≡N) groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred. Other useful carboxylic monomers are maleic acid and its anhydride.

The polymers include both homopolymers of carboxylic acids or anhydrides thereof, or the defined carboxylic acids copolymerized with one or more other vinylidene monomers containing at least one terminal >CH$_2$ group. The other vinylidene monomers are present in an amount of less than 30 weight percent based upon the weight of the carboxylic acid or anhydride plus the vinylidene monomer(s). Such monomers include, for example, acrylate ester monomers including those acrylic acid ester monomers such as derivatives of an acrylic acid represented by the formula

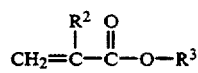

wherein $R^3$ is an alkyl group having from 1 to 30 carbon atoms, preferably 1 to 20 carbon atoms and $R_2$ is hydrogen, methyl or ethyl, present in the copolymer in amount, for example, from about 1 to 40 weight percent or more. Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl methacrylate, nonyl acrylate, hexyl acrylate, n-hexyl methacrylate, and the like. Higher alkyl acrylic esters are decyl acrylate, isodecyl methacrylate, lauryl acrylate, stearyl acrylate, behenyl acrylate and melissyl acrylate. Mixtures of two or three or more long chain acrylic esters may be successfully polymerized with one of the carboxylic monomers. Other comonomers include olefins, including alpha olefins, vinyl ethers, vinyl esters, and mixtures thereof.

The polymers also may be cross-linked with any polyene, e.g. decadiene or trivinyl cyclohexane; acrylamides, such as methylene bis acrylamide; polyfunctional acrylates, such as trimethylol propane triacrylate; or polyfunctional vinylidene monomer containing at least 2 terminal $CH_2<$ groups, including for example, butadiene, isoprene, divinyl benzene, divinyl naphthlene, allyl acrylates and the like. Particularly useful cross-linking monomers for use in preparing the copolymers are polyalkenyl polyethers having more than one alkenyl ether grouping per molecule. The most useful possess alkenyl groups in which an olefinic double bond is present attached to a terminal methylene grouping, $CH_2=C<$. They are made by the etherification of a polyhydric alcohol containing at least 2 carbon atoms and at least 2 hydroxyl groups. Compounds of this class may be produced by reacting an alkenyl halide, such as allyl chloride or allyl bromide, with a strongly alkaline aqueous solution of one or more polyhydric alcohols. The product may be a complex mixture of polyethers with varying numbers of ether groups. Analysis reveals the average number of ether groupings on each molecule. Efficiency of the polyether cross-linking agent increases with the number of potentially polymerizable groups on the molecule. It is preferred to utilize polyethers containing an average of two or more alkenyl ether groupings per molecule. Other cross-linking monomers include for example, diallyl esters, dimethallyl ethers, allyl or methallyl acrylates and acrylamides, tetraallyl tin, tetravinyl silane, polyalkenyl methanes, diacrylates, and dimethacrylates, divinyl compounds such as divinyl benzene, polyallyl phosphate, diallyloxy compounds and phosphite esters and the like. Typical agents are allyl pentaerythritol, allyl sucrose, trimethylolpropane triacrylate, 1,6-hexanediol diacrylate, trimethylolpropane diallyl ether, pentaerythritol triacrylate, tetramethylene dimethacrylate, ethylene diacrylate, ethylene dimethacrylate, triethylene glycol dimethacrylate, and the like. Allyl pentaerythritol, trimethylolpropane diallylether and allyl sucrose provide excellent polymers. When the cross-linking agent is present, the polymeric mixtures usually contain up to about 5% or more by weight of cross-linking monomer based on the total of carboxylic acid monomer, plus other monomers, if present, and more preferably about 0.01 to 3.0 weight percent.

Other vinylidene monomers may also be used, including the acrylic nitriles. The useful $\alpha$, $\beta$-olefinically unsaturated nitriles are preferably the monoolefinically unsaturated nitriles having from 3 to 10 carbon atoms such as acrylonitrile, methacrylonitrile, and the like. Most preferred are acrylonitrile and methacrylonitrile. The amounts used are, for example, for some polymers are from about 1 to 30 weight percent of the total monomers copolymerized. Acrylic amides containing from 3 to 35 carbon atoms including monoolefinically unsaturated amides also may be used. Representative amides include acrylamide, methacrylamide, N-t-butyl acrylamide, N-cyclohexyl acrylamide, higher alkyl amides, where the alkyl group on the nitrogen contains from 8 to 32 carbon atoms, acrylic amides including N-alkylol amides of alpha,beta-olefinically unsaturated carboxylic acids including those having from 4 to 10 carbon atoms such as N-methylol acrylamide, N-propanol acrylamide, N-methylol methacrylamide, N-methylol maleimide, N-methylol maleamic acid esters, N-methylol-p-vinyl benzamide, and the like. Still further useful materials are alphaolefins containing from 2 to 18 carbon atoms, more preferably from 2 to 8 carbon atoms; dienes containing atom 4 to 10 carbon atoms; vinyl esters and allyl esters such as vinyl acetate; vinyl aromatics such as styrene, methyl styrene and chlorostyrene; vinyl and allyl ethers and ketones such as vinyl methyl ether and methyl vinyl ketone; chloroacrylates; cyanoalkyl acrylates such as $\alpha$-cyanomethyl acrylate, and the $\alpha$-, $\beta$-, and $\gamma$-cyanopropyl acrylates; alkoxyacrylates such as methoxy ethyl acrylate; haloacrylates as chloroethyl acrylate; vinyl halides and vinyl chloride, vinylidene chloride and the like; divinyls, diacrylates and other polyfunctional monomers such as divinyl ether, diethylene glycol diacrylate, ethylene glycol dimethacrylate, methylene-bis-acrylamide, allylpentaerythritol, and the like; and bis ($\beta$-haloalkyl) alkenyl phosphonates such as bis($\beta$-chloroethyl) vinyl phosphonate and the like as are known to those skilled in the art. Copolymers wherein the carboxy containing monomer is a minor constituent, and the other vinylidene monomers present as major components are readily prepared in accordance with the process of this invention.

The steric stabilizer functions to provide a steric barrier which repulses approaching particles. A requirement for the steric stabilizer is that a segment of the dispersant (i.e., a hydrophobe) be very soluble in the solvent (the continuous phase in a nonaqueous dispersion polymerization process) and that another segment (i.e., a hydrophile) be at least strongly adhered to the growing polymer particle. Thus, the steric stabilizers of the present invention have a hydrophilic group and a hydrophobic group. The steric stabilizers are block copolymers comprising a soluble block and an anchor block having a molecular weight (i.e., chain length) usually well above 1000, but a hydrophobe length of more than 50 Angstroms, as calculated by the Law of Cosines. These dimensions are determined on the extended configuration using literature values for bond lengths and angles. Thus the steric stabilizers of the present invention are distinguishable from the prior art steric surfactants which may be block copolymers, but have hydrophobe lengths of less than 50 Angstroms. The steric stabilizer of the present invention has either a linear block or a comb configuration, and has a hydrophobe of sufficient length to provide a sufficient steric barrier.

When the steric stabilizer is a linear block copolymeric steric stabilizer, it is defined by the following formula:

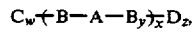

where A is a hydrophilic moiety, having a solubility in water at 25° C. of 1% or greater, a molecular weight of from about 200 to about 50,000, and selected to be covalently bonded to the B blocks;

B is a hydrophobic moiety, having a molecular weight of from about 300 to about 60,000, a solubility of less than 1% in water at 25° C., capable of being covalently bonded to the A blocks;

C and D are terminating groups which can be A or B; can be the same or different groups, and will depend upon the manufacturing process since they are present to control the polymer length, to add other functionality, or as a result of the manufacturing process;

w is 0 or 1;

x is an integer of 1 or more, y is 0 or 1, and z is 0 or 1.

Examples of hydrophilic groups are polyethylene oxide, poly(1,3-dioxolane), copolymers of polyethylene oxide or poly(1,3-dioxolane), poly(2-methyl-2-oxazoline polyglycidyl trimethyl ammonium chloride, polymethylene oxide, and the like, with polyethylene oxide being preferred. Examples of hydrophobic groups are polyesters, such as those derived from 2-hydroxybutyric acid, 3-hydroxybutyric acid, 4-hydroxybutyric acid, 2-hydroxycaproic acid, 10-hydroxydecanoic acid, 12-hydroxydodecanoic acid, 16-hydroxyhexadecanoic acid, 2-hydroxyisobutyric acid, 2-(4-hydroxyphenoxy) propionic acid, 4-hydroxyphenylpyruvic acid, 12-hydroxystearic acid, 2-hydroxyvaleric acid, polylactones, such as caprolactone, butyrolactone, polylactams, such as those derived from caprolactam, polyurethanes, polyisobutylene, where the hydrophobe should provide a steric barrier of greater than 50 Angstroms, preferably greater than 75 Angstroms, with greater than 100 Angstroms being also preferred, and the like, with polyhydroxy fatty acids, such as poly(12-hydroxystearic acid) being preferred. The steric barrier is the length of the hydrophobe in its fully-extended condition. Such steric stabilizers are commercially available under the brand name Hypermer® from Imperial Chemical Industries, Inc.

Steric stabilizer molecules comprise both hydrophilic and hydrophobic units. Hydrophobic polymer units or hydrophobic blocks may be prepared by a number of well known methods. These methods include condensation reactions of hydroxy acids, condensation of polyols (preferably diols) with polycarboxylic acids (preferably diacids). Other useful methods include polymerization of lactones and lactams, and reactions of polyols with polyisocyanates. Hydrophobic blocks or polymer units can be reacted with hydrophilic units by such reactions as are known to those skilled in the art. These reactions include condensation reactions and coupling reactions, for example. Subsequent to the steric stabilizer preparation, the stabilizers may be further reacted with modifying agents to enhance their utility. U.S. Pat. No. 4,203,877 to Alan S. Baker teaches making such steric stabilizers, and the entire disclosure thereof is incorporated herein by reference.

When the steric stabilizer is a random copolymeric comb steric stabilizer, it is defined by the following formula:

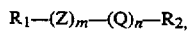

$R_1-(Z)_m-(Q)_n-R_2,$ where $R_1$ and $R_2$ are terminating groups and may be the same or different and will be different from Z and Q, Z is a hydrophobic moiety having a solubility of less than 1% in water at 25° C., Q is a hydrophilic moiety, having a solubility of more than 1% in water at 25° C., m and n are integers of 1 or more, and are selected such that the molecular weight of the polymer is from about 100 to about 250,000.

Examples of the hydrophobic monomer unit or moiety are dimethyl siloxane, diphenyl siloxane, methylphenyl siloxane, alkyl acrylate, alkyl methacrylate, and the like, with dimethyl siloxane being preferred.

Examples of the hydrophilic monomer unit or moiety are methyl-3-polyethoxypropyl siloxane-Ω-phosphate or sulfate, and the alkali metal or ammonium salts derived therefrom; traits derived from polyethoxy (meth)acrylate containing from 1 to 40 moles of ethylene oxide; acrylic acid; acrylamide; methacrylic acid, maleic anhydride; dimethyl amino ethyl (meth)acrylate; or its salts with methyl chloride or dimethyl sulfate; dimethyl amino propyl(meth)acrylamide and its salts with methyl chloride or dimethyl sulfate, and the like, with methyl-3-polyethoxypropyl siloxane-Ω-phosphate being preferred.

Examples of terminating agents are monohalo silanes, mercaptans, haloalkanes, alkyl aromatics, alcohols, and the like, which will produce terminating groups such as trialkyl silyl, alkyl, aryl alkyl, alcoholate, and the like, with the preferred terminating groups being trimethyl silyl.

An example of a random copolymeric comb steric stabilizer is a dimethicone copolyol phosphate which has the following formula:

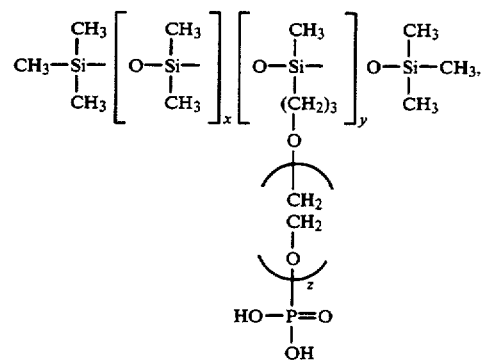

where x and y are integers greater than 1, and z is an integer from 1 to 100. Such a copolymeric comb steric stabilizer is available commercially under the trade name Pecosil from Phoenix Chemical, Somerville, N.J.

The steric stabilizers employed in the interpolymer have the potential for becoming part of a (meth)acrylic acid or anhydride-containing polymer as an interpolymer by several mechanisms, including a bonding mechanism, including graft-type polymerization, hydrogen bonding, olefinic unsaturation polymerization, or condensation reaction. The particular bonding mechanism theory is not relevant to the present invention, and is covered in copending U.S. patent application Ser. No. 07/935,616, now U.S. Pat. No. 5,288,814.

The wetting additive is preferrably a low surface tension surfactant (or wetting aid) can be a fluorine containing, silicone containing or hydrocarbon surfactant, as long as it has an ability to reduce the surface tension of water (which is 72 dynes per centimeter at 25° C.), preferably to less than 40 dynes/era at 25° C., with less than 30 dynes/cm being further preferred. By the term hydrocarbon surfactant we mean any surfactant which contains carbon, hydrogen, and oxygen and does not contain fluorine or silicone molecules. The amount of low surface tension surfactant will usually be less than 10% by weight based upon the weight of the acrylic acid interpolymer or phr, although 0.001 phr to 5.0 phr is preferred. The exact amount will depend upon the surfactant which is selected and its ability to reduce the surface tension of water. Those surfactants which can be used at the least doseage, such as a fluorine containing surfactant are preferred. Further, it was unexpectedly discovered that some of the surfactants are quite effective at very low doseages, such that the surfactant has no or little effect on the properties of the interpolymer in its use as a thickener, emulsifier, or thickening aid. Although not fully understood, it is believed that some of the surfactants when used in greater doses will result in increased wetting times because the additional surfactant will provide an additional coating on the polymer particles and slow the wetting process.

Table I shows a list of low surface tension surfactants which can be used in accordance with the present invention. The surface tension values represent the ability of a 1% by weight dosage of these surfactants to reduce the surface tension of water at 25° C. As can be appreciated, this list is considered representative and other low surface tension surfactants could be employed.

The surfactants employed can be anionic, cationic, or nonionic with nonionic surfactants being preferred. When the surfactant is added pre-polymerization, the cationic and anionic nature of the surfactant can play a part in or influence the polymerization, while the nonionic surfactants remain relatively inactive, and continue to be present after the polymer is recovered and put into use.

the presence of the alcohol functionality will interfere or interact with the acid functionality of the acid polymer being formed. When added to the polymer post-polymerization, it is possible to control the conditions, such as excessive heat when drying, which could lead to interference or interaction.

The polyhydric alcohols are organic hygroscopic compositions, usually alcohols, which facilitate the wetting of the interpolymer particles in water. For the purpose of this disclosure, we mean the term "polyhydric alcohols" is to include all hygroscopic alcohol compositions including glycols, such as polyethylene glycol. The use of either a low surface tension surfactant or a polyhydric alcohol benefits the wetting of the polymer particles by aiding the wetting of the water by lowering the surface tension of the water and allowing it to penetrate the polymer particle or by drawing the particle to the water (or the water to the particle) via the hygroscopic mechanism. As will be seen either benefits the wetting of the polymer without detriment

TABLE 1

| SURFACTANT*<br>(Trade Name) | SUPPLIER | COMPOSITION | SURFACE TENSION<br>(Dynes/cm)<br>1% Dose @ 25° C. |
|---|---|---|---|
| Fluowet OTN (F/N) | Hoechst Celanese | fluoroaliphatic oxethylate | 18.09 |
| Forafac 1157N (F/N) | Atochem | polyfluoroalkyl betaine | 18.44 |
| Fluorad FC-170C (F/N) | 3M | fluorinated alkyl poloxyethylene ethanols | 19.95 |
| Forafac 1033 (F/N) | Atochem | anionic fluorinated surfactant | 20.84 |
| Fluorad FC-171 (F/N) | 3M | fluorinated alkyl alkoxalate | 20.84 |
| Silwet L-77 (S/N) | Union Carbide | polyalkyleneoxide modified heptamethyl trisiloxane | 21.35 |
| Fluorad FC-120 (F/A) | 3M | ammonium perfluoroalkyl sulfonate | 21.17 |
| Zonyl FSP (F/A) | DuPont | ammoniated phosphate fluorochemical | 23.04 |
| Zonyl FSN (F/N) | DuPont | hydroxy terminated fluorochemical | 22.18 |
| Silwet L-7600 (S/N) | Union Carbide | polyalkyleneoxide modified polydimethyl siloxane | 24.88 |
| Silwet L-7602 (S/N) | Union Carbide | polyalkyleneoxide modified polydimethyl siloxane | 25.15 |
| Silwet L-7604 (S/N) | Union Carbide | polyalkyleneoxide modified polydimethyl siloxane | 24.30 |
| Dow Corning 193 (S/N) | Dow Corning | silicone glycol copolymer | 28.93 |
| Neodol 25-7 (H/N) | Shell | $C_{12}$—$C_{15}$ linear primary alcohol ethoxylate | 28.84 |
| Glucopon 225CS (H/N) | Henkel | $C_8$—$C_{10}$ alkyl polysaccharide ether | 29.11 |
| Pecosil DIP 100 (H/N) | Phoenix Chemical | dimethicone copolyol phosphate | 27.65 |
| Pecosil PS-100 (H/N) | Phoenix Chemical | dimethicone copolyol phosphate | 30.35 |
| Pecosil PS-100-OP (H/N) | Phoenix Chemical | dimethicone copolyol phosphate | 30.54 |
| Adogen 432 (H/C) | Ashland Chemical | trialkyl ($C_8$—$C_{10}$) ammonium chloride | 30.21 |
| Triton X-100 (H/N) | Union Carbide | polyoxyethylene ether | 31.32 |
| Alpha-Step MC-48 (H/A) | Stepan Company | α sulfomethyl ester | 33.54 |

*F = fluorine containing; S = silicone containing; H = hydrocarbon; A = anionic; C = cationic; N = nonionic The wetting additive can be added to the monomers in polymerizing the polycarboxylic acid interpolymer or after polymerization, or in the case of the low surface tension surfactants, it also can be added to the water into which the interpolymer is to be dispersed. It is preferred that the wetting additive be admixed after or post-polymerization. It is theorized that, when the surfactant is added during polymerization, it remains with the polymer as an admixture, but a portion of the surfactant is trapped in the interstices of the interpolymer, so the same amount added pre-polymerization will not be as effective as that amount added post-polymerization of the interpolymer. Further, there is nothing critical in the method of addition. For example, the surfactant can be added as a liquid to interpolymer while it is still in the polymerization solvent and before drying or it can be sprayed on the dry polymer powder which can then be subject to further drying.

The glycol and polyhydric alcohol are most preferredly admixed after polymerization, and provide little or no benefit when added to the water into which the interpolymer is to be dispersed. It is reasoned that to the use of the polymer as, e.g., a thickener.

The preferred polyhydric alcohols are glycerine (or glycerol). The preferred glycol is low molecular weight polyethylene glycol. Other polyhydric alcohols (or polyols) or glycols can be employed.

To better understand the invention, it is best to start with the preparation of the interpolymer. It can be appreciated that various polycarboxylic acid interpolymers, including polymers and copolymers, can be made by varying the monomers employed, as is disclosed in copending U.S. patent application Ser. No. 07/935,616, now U.S. Pat. No. 5,288,814, which disclosure is incorporated by reference.

EXAMPLE OF PREPARATION OF THE INTERPOLYMER

This illustrates the polymerization of an interpolymer of acrylic acid with an acrylate ester in a water jacketed two liter Pyrex resin kettle equipped with mechanical stirrer, a thermometer, and a reflux condenser topped with a nitrogen inlet connected to a bubbler to provide a slightly positive pressure of nitrogen throughout the polymerization was employed. The water jacket was connected to a constant temperature circulator. The resin kettle was charged with ethyl acetate (656.1 grams), cyclohexane (558.9 grams), acrylic acid (276.45 grams), stearyl methacrylate (8.55 grams), allylsucrose (1.71 grams), and Hypermer B-246 steric stabilizing surface active agent (8.55 grams) all based upon the weight of the acrylic acid and acrylate ester comonomers (i.e., phm or parts per hundred monomers). The mixture was sparged with nitrogen for 30 minutes while the reactor was heated to 50° C. At 50° C., the sparging tube was removed while a nitrogen purge was maintained, stirring was begun, and the recipe amount of di-(2-ethylhexyl)-peroxydicarbonate (in an amount of 0.20 to 0.98 grams) was added, the exact amount depending upon process conditions. Polymerization was evident in a matter of minutes as the solution became hazy with precipitated polymer, but the polymerization was continued for a total of 8 hours when polymerization was considered complete. The polymer slurry was then transferred to a single neck flask for solvent removal by a rotary evaporator at 95° to 105° C. at 27 inches of vacuum. After drying, the result is a fine white interpolymer product which when dispersed in water and neutralized, can be used to make thickened aqueous solutions, emulsions or suspending aids.

The wetting additive can be added with the monomers, e.g., when the steric stabilizing surface active agent is added, or at the point after polymerization but before the solvent removal and drying. The polyhydric alcohol or the glycol is preferrably added after polymerization. In either case, the result is a fine white interpolymer having a wetting additive admixed therewith. Alternatively, if the interpolymer is dispersed in water to which a low surface active surfactant has been added, the interpolymer will wet-out faster.

To understand how the wetting and dispersing of the interpolymer is enhanced in accordance with the present invention, the following examples are set forth.

EXAMPLES 1-4

Example 1

To demonstrate the improved wetting effect of the present invention a series of commercial polymers were evaluated for wetting times with and without an admixture of 0.5% by weight of polymer (i.e., phr) of Fluorad FC-171 fluorochemical surfactant, which is a low surface tension surfactant, the results are set forth in Table II. The test was based on the following wetting time test.

Wetting Time Test

Wetting times were done using a 0.5% dispersion in water (1 g resin/200 ml demineralized (DM) water), in a 400 milliliter beaker. The resin was added at once to the surface of the water without stirring. The speed of wetting was visually assessed by observing the transparency of the wetted swollen microgels. When all the microgel particles appeared to be wet, the final time was taken.

The notations Pre-add and Post-add, in Table II, refer to adding the surfactant before polymerization and after polymerization, respectively. Polymer A is a commercially available crosslinked polyacrylic acid polymer, while polymer B is a commercially available crosslinked polyacrylic acid/acrylate copolymer. Polymer C is a commercially available crosslinked polyacrylic acid polymer produced in a different solvent system than polymer A. Polymer D is an interpolymer such as is made by the interpolymer example presented herein. The wetting time values for five samples of the interpolymer range of from 17 minutes and 16 seconds to 19 minutes and 15 seconds, so an average of the five samples of 18 minutes: 11 seconds is used for comparison. As can be seen in the table below, the non-sterically stabilized polymers (A, B & C) show extremely slow wetting characteristics. The sterically stabilized interpolymer, sample D, shows improved wetting behavior while the samples which are admixtures of the interpolymer and a surfactant (e.g., Examples 8 and 9) show significantly improved wetting times. As can be seen, the wetting characteristics of the interpolymer are better when the surfactant is post-added versus when the surfactant is pre-added.

TABLE II

| Example | Polymer Sample Description | Low Surface Tension Surfactant (phr) | Admix Process | Time to Wet (Mins.:Secs.) |
|---|---|---|---|---|
| 1 | A | None | — | 30:00+ |
| 2 | A | 0.5 | (Post-Add) | 30:00+ |
| 3 | B | None | — | 30:00+ |
| 4 | B | 0.5 | (Post-Add) | 30:00+ |
| 5 | C | None | — | 30:00+ |
| 6 | C | 0.5 | (Post-Add) | 30:00+ |
| 7 | D | None | — | 18:11 |
| 8 | D | 0.5 | (Pre-Add) | 2:50 |
| 9 | D | 0.5 | (Post-Add) | 1:45 |

Example 2

In this example, additional low surface tension surfactants were post-added to polymers C & D and a polyhydric alcohol and a glycol were added to Polymer D from Example 1 and the polymers-wetting additive admixtures were evaluated for wettability as in the previous example. The results shown in Table III support the fact that a wide variety of surfactants can be employed when post-added provided they are used at an effective dosage. Too large an amount of surfactant can be as ineffective as can be a too little amount. Too much is believed to result in an "overcoating" of the polymer particles which leads to slower wetting times. The data also shows that an organic hydroscopic material such as polyglycol or glycerine, which is a polyhydric alcohol, can be post-added to an interpolymer to increase the wetting time.

TABLE III

| Example | Polymer | Surfactant | Dose (phr) | Time to Wet |
|---|---|---|---|---|
| 5 | C | None | — | 30:00+ |
| 6 | C | Fluorad FC-171 | 0.5 | 30:00+ |
| 10 | C | Silwet L-77 | 1.0 | 30:00+ |
| 7 | D | None | — | 18:11 |
| 8 | D | Fluorad FC-171* | 0.5 | 2:50 |
| 9 | D | Fluorad FC-171 | 0.5 | 1:45 |
| 11 | D | Fluowet OTN | 0.15 | 4:20 |
| 12 | D | Fluowet OTN | 0.25 | 4:25 |
| 13 | D | Fluowet OTN | 0.35 | 3:40 |
| 14 | D | Fluowet OTN | 0.50 | 7:30 |
| 15 | D | Fluowet OTN | 1.00 | 30:00+ |
| 16 | D | Silwet L-77 | 1.00 | 2:35 |
| 17 | D | Silwet L-77 | 1.50 | 2:55 |
| 18 | D | Silwet L-77 | 2.00 | 3:25 |
| 19 | D | Pecosil DIP 100 | 2.00 | 6:10 |
| 20 | D | Pecosil DIP 100 | 1.00 | 8:01 |
| 21 | D | Pecosil DIP 100 | 0.50 | 8:11 |
| 22 | D | Pecosil PS-100-OP | 2.00 | 30:00+ |
| 23 | D | Pecosil PS-100-OP | 1.00 | 18:32 |

TABLE III-continued

| Example | Polymer | Surfactant | Dose (phr) | Time to Wet |
|---|---|---|---|---|
| 24 | D | Pecosil PS-100-OP | 0.50 | 7:21 |
| 25 | D | Pecosil PS-100 | 2.00 | 30:00+ |
| 26 | D | Pecosil PS-100 | 1.00 | 30:00+ |
| 27 | D | Pecosil PS-100 | 0.50 | 13:31 |
| 28 | D | Neodol 25-7 | 0.5 | 6:20 |
| 29 | D | Polyglycol E400 | 2.00 | 7:40 |
| 30 | D | Polyglycol E400 | 1.00 | 7:40 |
| 31 | D | Polyglycol E400 | 0.50 | 6:13 |
| 32 | D | Glycerine | 2.00 | 4:26 |
| 33 | D | Glycerine | 1.00 | 3:31 |
| 34 | D | Glycerine | 0.50 | 4:36 |

*Surfactant was admixed prepolymerization, so the dose is parts per monomer. All other examples, where applicable, admixing was post-polymerization.

Example 3

The following example shows the polymer performance properties are not affected by the presence of the wetting additive. Table IV shows the affect post addition of Fluorad FC-171 low surface tension surfactant, Polyglycol E-400 and glycerine have on the aqueous mucilage and other properties of Polymer D, from Example 1. There is little effect on the aqueous properties over the concentrations investigated, clarity, and salt sensitivity of the polymer, which evaluations are as follows:

Clarity

Clarity is the measurement of the percentage of light transmitted through the dispersed, hydrated and neutralized polymer at a resin concentration of 0.5%. Clarity is measured with a Brinkman PC 801 colorimeter at 420 nanometers (nm). The higher the percent transmittance, the better the clarity. A transmittance of greater than 60% is acceptable. A clarity of 100% is considered the best.

Thickening Viscosity P A 1% stock dispersion of interpolymer (8 g resin/792 g water) is prepared in demineralized (DM) water, using, if necessary, a Lightnin' mixer at 1,000 rpm with a 3-blade marine impeller. The resin can be introduced through a 20 mesh screen with stirring and the dispersion was mixed for a total of one hour. The viscosity of the dispersion is referred to as the Dispersion Viscosity or Unneutralized Viscosity.

The 1% stock dispersion was then used to make the following typical concentrations for analysis, some or all of which may be measured:

0.2% Mucilage (80 g of stock dispersion diluted to a total of 400 g with DM water)

0.5% Mucilage (200 g of stock dispersion diluted to a total of 400 g with DM water)

1.0% Mucilage (400 g of stock dispersion used as is)

These dispersions are neutralized to pH 7.3-7.8 with 18% NaOH using an S-paddle at 300 rpm for 3-5 minutes, after which the mucilages were allowed to stand at room temperature for at least 30 minutes.

The samples were then measured for pH and Brookfield Viscosity using a Brookfield RVT-DV Viscometer at 20 rpm. The viscosity of the neutralized dispersions is referred to as the Neutralized Viscosity. A Neutralized Viscosity of more than 20,000 cPs at 0.5% resin concentration is desirable.

Salt Sensitivity

Salt sensitivity on 1.0% mucilages are evaluated at 1.0% salt concentrations using the same sample from the Brookfield Viscosity study; NaCl is added in solid form with stirring using an S-paddle at 300 rpm for 3-5 minutes. Actual salt additions of 2.0 g are made with the Brookfield Viscosities being read between additions. The results are reported as Salt Sensitivity Viscosity. A high viscosity is desirable since it shows that there is not a severe impairment of the viscosity by the salt.

TABLE IV

| Admixture | Dose (phr) | Brookfield Viscosity (cPs) | | | Salt Sensitivity 1% NaCl/ 1% B.V. Viscosity (cPs) | Clarity (%) |
|---|---|---|---|---|---|---|
| | | 0.2% | 0.5% | 1.0% | | |
| None | 0.0 | 22,300 | 42,200 | 78,500 | 2,510 | 97.6 |
| Fluorad FC-171 | 0.2 | 23,500 | 55,500 | 83,000 | 2,110 | 97.2 |
| Fluorad FC-171 | 0.5 | 21,500 | 57,500 | 82,000 | 2,270 | 97.1 |
| Fluorad FC-171 | 1.0 | 23,700 | 42,700 | 82,000 | 2,590 | 96.7 |
| Polyglycol E400 | 1.0 | 24,350 | 49,400 | 85,800 | 2,285 | 93.2 |
| Glycerine | 0.5 | 23,200 | 51,000 | 77,500 | 5,500 | 95.6 |
| Glycerine | 1.0 | 22,000 | 47,000 | 78,000 | 5,050 | 93.9 |
| Glycerine | 2.0 | 23,500 | 53,000 | 84,500 | 6,000 | 93.0 |

Example 4

The results in Table V and VI show the benefits of adding the surfactant to the water to improve the wetting time of the interpolymer. The interpolymer used was Polymer D from Example 1. Even though the final aqueous concentrations of surfactants in Example 4 are many times greater than in Example 2, the wetting times can be slower. This is believed to be due to the high concentration of surfactant at the polymer-water interface in the preferred samples of Example 2, whereas said surfactant is more uniformly distributed throughout the aqueous medium in Example 4. As seen from Tables V and VI, the polyhydric alcohols do not enhance wetting when added to the water into which the polymer is to be dispersed and not on the polymer, even when used as higher concentrations.

TABLE V

| SURFACTANT* | 1% DOSE | | 0.1% DOSE | | 0.01% DOSE | |
|---|---|---|---|---|---|---|
| | SURFACE TENSON (dynes/cm.) | WETTING TIME (Min:Sec) | SURFACE TENSION (dynes/cm.) | WETTING TIME (Min:Sec) | SURFACE TENSION (dynes/cm.) | WETTING TIME (Min:Sec) |
| Fluowet OTN (N) | 18.09 | 3:23 | 19.24 | 6:19 | 28.33 | 6:19 |
| Forafac 1157N (N) | 18.43 | 8:04 | 18.88 | 9:06 | 21.28 | 8:28 |
| Fluorad FC-170C (N) | 19.95 | 4:52 | 21.19 | 4:52 | 28.24 | 7:22 |
| Forafac 1033 (N) | 20.84 | 3:19 | 31.83 | 8:28 | 66.35 | 12:42 |
| Fluorad FC-171 (N) | 20.84 | 4:30 | 22.00 | 5:55 | 29.89 | 7:35 |
| Silwet L-77 (N) | 21.35 | 3:15 | 21.26 | 5:25 | 21.79 | 7:05 |
| Fluorad FC-120 (A) | 21.17 | 20:13 | 22.42 | 4:04 | 46.74 | 8:22 |
| Zonyl FSP (A) | 23.04 | 30:00+ | 24.42 | 5:48 | 30.30 | 9:57 |
| Zonyl FSN (N) | 22.18 | 5:21 | 24.43 | 9:40 | 28.79 | 9:43 |
| Silwet L-7600 (N) | 24.88 | 8:07 | 25.15 | 7:37 | 29.34 | 9:49 |

TABLE V-continued

| | 1% DOSE | | 0.1% DOSE | | 0.01% DOSE | |
|---|---|---|---|---|---|---|
| SURFACTANT* | SURFACE TENSON (dynes/cm.) | WETTING TIME (Min:Sec) | SURFACE TENSION (dynes/cm.) | WETTING TIME (Min:Sec) | SURFACE TENSION (dynes/cm.) | WETTING TIME (Min:Sec) |
| Silwet L-7602 (N) | 25.15 | 8:39 | 30.08 | 9:19 | 45.68 | 25:12 |
| Silwet L-7604 (N) | 24.30 | 6:05 | 24.75 | 7:02 | 30.67 | 9:08 |
| Dow Corning 193 (N) | 28.93 | 10:12 | 28.20 | 9:43 | 32.61 | 11:41 |
| Neodol 25-7 (N) | 28.84 | 4:33 | 28.66 | 8:16 | 29.48 | 10:48 |
| Glucopon 225CS (N) | 29.11 | 9:28 | 28.29 | 7:04 | 52.23 | 13:57 |
| Pecosil DIP 100 (N) | 27.65 | 6:58 | 28.75 | 7:39 | 31.59 | 10:33 |
| Pecosil PS-100 (N) | 30.35 | 10:22 | 35.92 | 12:37 | 60.38 | 15:42 |
| Pecosil PS-100-OP (N) | 30.54 | 7:57 | 38.17 | 7:32 | 63.85 | 10:30 |
| Adogen 432 (C) | 30.21 | 30:00+ | 30.58 | 11:00 | 34.46 | 17:10 |
| Triton X-100 (N) | 31.32 | 6:50 | 31.04 | 6:52 | 35.58 | 7:41 |
| Alpha-Step MC-48 (A) | 33.54 | 30:00+ | 31.87 | 7:28 | 40.84 | 11:57 |
| Polyglycol E400 (N) | 67.25 | 23:54 | 69.45 | 23:43 | 70.00 | 30:00+ |
| Glycerine (N) | 69.79 | 23:35 | 70.89 | 26:10 | 70.89 | 24:51 |

*A = Anionic; C = Cationic; N = Nonionic

TABLE VI

| | 10% DOSE | | 5% DOSE | |
|---|---|---|---|---|
| SURFACTANT | SURFACE TENSION (dynes/cm.) | WETTING TIME (Min:Sec) | SURFACE TENSION (dynes/cm.) | WETTING TIME (Min:Sec) |
| Polyglycol E400 | 58.01 | 30:00+ | 63:55 | 27:00 |
| Glycerine | 67.39 | 24:31 | 70.79 | 25:02 |

In summary, admixture of an interpolymer and a low surface tension surfactant results in a polymer which is easier to wet and easy to disperse, without loss of properties desired in the polymer. These resins disperse in minutes when added to water, and have no detrimental effects on final application properties.

The foregoing embodiments of the present invention have been presented for purposes of illustration and description. These description and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

What we claim is:

1. An interpolymer of
   (1) at least one olefinically unsaturated carboxylic acid or anhydride containing at least one activated carbon-to-carbon olefinic double bond and at least one carboxyl group, in an mount of more than 15% by weight based upon the weight of the interpolymer, and
   (2) at least one steric stabilizer having at least one hydrophilic moiety and at least one hydrophobic moiety, selected from the group consisting of linear block copolymeric steric stabilizers, having a hydrophobic moiety having a length of more than 50 Angstroms, random copolymeric comb steric stabilizers, and mixtures thereof, having admixed therewith a wetting additive selected from the group consisting of a low surface tension surface active agent, a glycol, a polyhydric alcohol and mixtures thereof.

2. The interpolymer of claim 1 wherein said wetting additive is present in an mount of about 0.001% to about 10.0% by weight based upon the weight of the interpolymer.

3. The interpolymer of claim 1 wherein said wetting additive is present in an mount about 0.001% to about 5.0% by weight based upon the weight of the interpolymer.

4. The interpolymer of claim 1 wherein said wetting additive is present in an mount of about 0.001% to about 2.0% by weight based upon the weight of the interpolymer.

5. The interpolymer of claim 1 wherein said wetting additive is admixed with said interpolymer after said interpolymer is polymerized.

6. The interpolymer of claim 1 wherein said polyhydric alcohol is glycerine.

7. The interpolymer of claim 1 wherein said low surface tension surface active agent is selected from the group consisting of hydrocarbon, fluorocarbon and silicone surface active agents capable of reducing the surface tension of water to less than about 40 dynes per centimeter at 25° C.

8. The interpolymer of claim 1 wherein said low surface tension surface active agent is selected atom the group consisting of hydrocarbon, fluorocarbon and silicone surface active agents capable of reducing the surface tension of water to less than about 30 dynes per centimeter at 25° C.

9. The interpolymer of claim 1 wherein said steric stabilizer is present in an mount of 0.001 to 15% by weight based upon the weight of said carboxylic acid or said anhydride.

10. The interpolymer of claim 1, wherein said linear block copolymeric steric stabilizer, it is defined by the following formula:

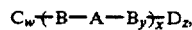

wherein A is a hydrophilic moiety having a solubility in water at 25° C. of 1% or greater, a molecular weight of from about 200 to about 50,000, and selected to be covalently bonded to B;

B is a hydrophobic moiety having a molecular weight of from about 300 to about 60,000, a solubility of less than 1% in water at 25° C., capable of being covalently bonded to A;

C and D are terminating groups which can be A or B, can be the same or different groups, w is 0 or 1;

x is an integer of 1 or more, y is 0 or 1, and z is 0 or 1.

11. The interpolymer of claim 1, wherein said random copolymeric comb steric stabilizer, it is defined by the following formula:

$$R_1-(Z)_m-(Q)_n-R_2$$

where $R_1$ and $R_2$ are terminating groups and may be the same or different and will be different from Z and Q, Z is a hydrophobic moiety having a solubility of less than 1% in water at 25° C., Q is a hydrophilic moiety, having a solubility of more than 1% in water at 25° C., and m and n are integers of 1 or more, and are selected such that the molecular weight is from about 100 to about 50,000.

12. The interpolymer of claim 1 wherein said block copolymer is a block copolymer of 12-hydroxystearic acid.

13. The interpolymer of claim 12 wherein said polymer of 12-hydroxystearic acid is a block copolymer with polyethylene oxide.

14. The interpolymer of claim 12 wherein said polymer of 12-hydroxystearic acid is an ABA block copolymer.

15. The interpolymer of claim 1 wherein in said carboxylic acid, said olefinic double bond is in the alpha-beta position with respect to a carboxyl group, or is part of a terminal methylene group.

16. The interpolymer of claim 1 wherein said carboxylic acid is selected from the group consisting of acrylic acid, methacrylic acid, and maleic acid.

17. The interpolymer of claim 1 wherein said anhydride is maleic anhydride.

18. The interpolymer of claim 1 wherein said carboxylic acid or anhydride is present in amounts greater than 40 weight percent based upon the weight of the interpolymer.

19. The interpolymer of claim 1 wherein at least one olefinically unsaturated monomer containing at least one $CH_2=C<$ group is copolymerized therewith.

20. The interpolymer of claim 18 wherein said olefinically unsaturated monomer is an acrylamide or substituted acrylamide.

21. The interpolymer of claim 16 wherein at least one $C_1-C_5$ alkyl vinyl ether is polymerized therewith.

22. The interpolymer of claim 20 wherein at least one $C_2-C_{30}$ alpha olefin is polymerized therein.

23. The interpolymer of claim 1 wherein there is present less than 5 weight percent based upon the weight of the carboxylic acid or anhydride of a polyfunctional crosslinking vinylidene monomer containing at least two terminal $CH_2<$ groups.

24. The interpolymer of claim 23 wherein said crosslinking monomer is selected from the group consisting of allyl pentaerythritol, allyl sucrose and trimethylolpropane diallylether.

25. The interpolymer of claim 1 further including at least one acrylic acid ester of the formula:

$$CH_2=C-\overset{R^2}{\underset{}{C}}-\overset{O}{\underset{}{\overset{\|}{C}}}-O-R^3$$

wherein $R^2$ is hydrogen, methyl or ethyl and $R^3$ is an alkyl group containing 1 to 30 carbon atoms, in an amount of less than 30 weight percent based upon the weight of the acrylic acid or anhydride plus the acrylic acid ester.

26. The interpolymer of claim 25 wherein $R^2$ is hydrogen or methyl and $R^3$ is an alkyl group containing 2 to 20 carbon atoms.

27. The interpolymer of claim 1 wherein said comb steric stabilizer is a polymer of dimethicone copolyol phosphate.

* * * * *